United States Patent [19]
Kane et al.

[11] 3,923,615
[45] Dec. 2, 1975

[54] WINNING OF METAL VALUES FROM ORE UTILIZING RECYCLED ACID LEACHING AGENT

[75] Inventors: William S. Kane, Wicomic; Paul H. Cardwell, Zanoni, both of Va.

[73] Assignee: Deepsea Ventures, Inc., Gloucester Point, Va.

[22] Filed: July 16, 1973

[21] Appl. No.: 379,213

Related U.S. Application Data

[63] Continuation-in-part of Ser. No. 272,226, July 17, 1972, Pat. No. 3,795,596, which is a continuation of Ser. No. 40,585, May 26, 1970, abandoned, which is a continuation-in-part of Ser. No. 247,554, April 26, 1972.

[52] U.S. Cl.................. 204/105 M; 75/117; 75/119; 75/121; 75/115; 75/101 R; 75/101 BE; 423/24; 423/49; 423/139; 423/140
[51] Int. Cl............................................... C25c 1/10
[58] Field of Search.......... 75/117, 119, 121, 101 R, 75/115, 101 BE; 204/105 M; 423/24, 139, 140, 49

[56] References Cited
UNITED STATES PATENTS

| | | | |
|---|---|---|---|
| 2,430,346 | 11/1947 | Koster.................................. | 75/121 |
| 3,723,095 | 3/1973 | Skarbo.................................. | 75/119 |

*Primary Examiner*—R. L. Andrews
*Attorney, Agent, or Firm*—Barry G. Magidoff

[57] ABSTRACT

This invention provides a process for selectively removing desirable metal values from an ocean floor nodule ore wherein the ore is initially leached with an aqueous solution of a mineral acid to preferentially form water-soluble salts of nickel and copper, which are dissolved in the leach solution, followed by releaching the solid leached ore under reducing conditions using a reducing reagent capable of reducing tetravalent manganese to divalent manganese and of forming water-soluble salts of cobalt and divalent manganese which are in turn dissolved into the leach solution resulting preferably in a single aqueous pregnant leach solution comprising the dissolved salts of copper, cobalt, nickel and divalent manganese. Preferably, the above four named metal values are individually separated into individual aqueous solutions which preferably are in turn reduced to the elemental metals by electrolysis procedures.

The advantage of this process lies in the fact that it can utilize waste products from this and other industrial procedures. The reducing reagents, which can be used, include ferrous salts obtained from pickling procedures, and the mineral acid leach solution can be recycled as spent electrolyte from the electrolysis procedures especially that for the formation of elemental manganese.

29 Claims, 1 Drawing Figure

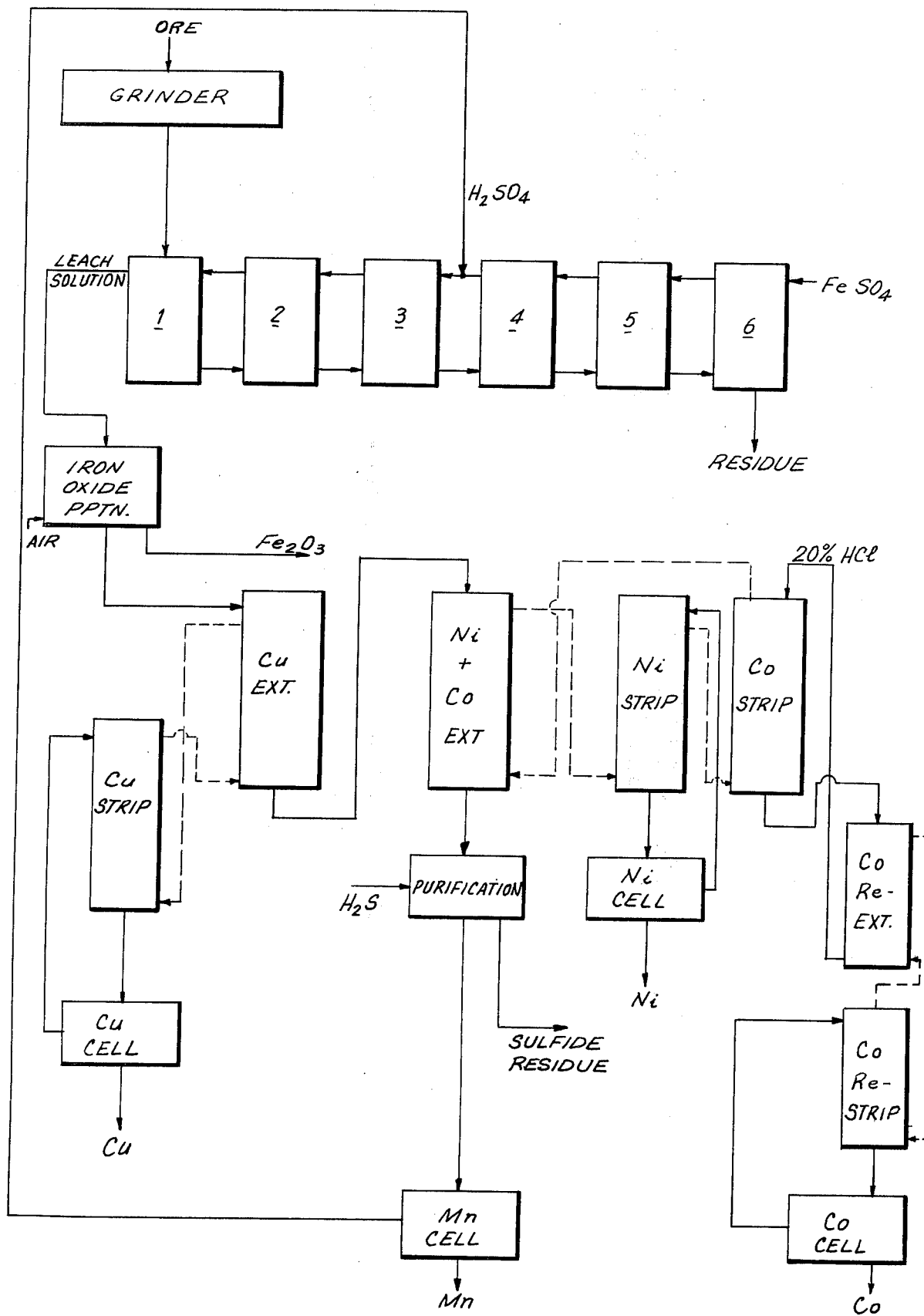

WINNING OF METAL VALUES FROM ORE UTILIZING RECYCLED ACID LEACHING AGENT

This application is a continuation-in-part of co-pending application Ser. No. 272,226, filed July 17, 1972, now U.S. Pat. 3,795,596, as a continuation of Ser. No. 40,585, filed May 26, 1970, now abandoned, and continuation in part of application Ser. No. 247,554 filed Apr. 26, 1972.

It is not a common situation to obtain a relatively valuable nonferrous metal such as nickel, cobalt, copper, manganese, titanium, indium and zinc, from minerals which contain a relatively high proportion of iron. A relatively untapped source of a high-quality manganiferous ore, however, is a material which is found on the ocean floor and has come to be known as ocean floor nodule ore.

With the increased awareness on the part of both the public and the metals industry of the ecological dangers that can arise from continued surface mining of minerals and the increased problems of pollution caused by the refining procedures required for most ores mined from the land, industry has been interested for several years now in the mining of minerals from the sea. This has been an extremely elusive target up to the present. The directions taken have included both attempts to wrest minerals directly from solution in sea water and the mining of ores which are available on the floor of the ocean. These ores do not require any digging into or stripping of the earth's crust; the ocean floor ores can merely be scooped up or in other ways removed from the ocean floor without actually rending the earth's surface.

Ocean floor nodules were first collected in the first half of the 1870's. They have been studied by many workers in an attempt to determine their composition, and after their composition had been determined to try to decipher ways to wrest from their peculiar structure the valuable metals contained therein. It is presently believed that these nodules are actually creations of the sea; they are somehow grown generally in the form of the metal oxides, from the metal compounds which are dissolved in sea water.

The metal values in the nodules are almost exclusively in the form of the oxides and moreover are present in a very peculiar physical configuration. The physical and chemical structure of the nodules are believed to be a direct result of the conditions under which they were created and to which they have been exposed since their creation. First, the nodules have never been exposed to temperatures other than those at the bottom of the ocean at the location at which they were formed. They have an extremely large surface area, often better than 50% porosity, and they are thus relatively chemically reactive ores.

The nodules are formed as an extremely complex crystal matrix of iron and manganese oxides: tiny grains of each oxide of a size and type which are substantially impossible to separate with present available physical means. These iron and manganese oxides form the crystalline structure within which are held, by means not precisely known, other metal compounds, most likely oxides, including those of nickel, copper and cobalt, as the main ingredients, followed by chromium, zinc, tin, vanadium, and many more elements, including the rare metals silver and gold.

In addition to the crystals of compounds of the valuable metals present, there is also a large quantity of silt, or gangue material, intimately admixed in the nodule ore. This silt, or gangue, is sand and clay, and includes the usual oxides of silicon and aluminum in varying proportions and some carbonates, especially calcium carbonate.

The precise chemical composition of the nodules varies depending upon their location in the ocean. The variation apparently is caused by differences in temperature in various places, differences in composition of sea water perhaps caused by the pressure and temperature variations at different depths and composition of adjacent land areas, variations in the amount of oxygen which is present in the water in different locations and perhaps other variables not readily apparent to observers. Generally, however, in almost all cases the metals which are present in primary proportions are manganese and iron. The following table (taken from an article entitled "The Geochemistry of Manganese Nodules and Associated Deposits from the Pacific and Indian Oceans" by Croonan and Tooms in *Deep Sea Research* (1969), Volume 16, pages 335–359, Pergamon Press (Great Britain) shows the relative compositions of the most valuable metals contained in nodules taken from different areas within the Pacific and Indian Oceans.

Table I

|   | 1 | 2 | 3 | 4 | 5 | 6 | 7 | 8 | 9 |
|---|---|---|---|---|---|---|---|---|---|
| Mn | 13.95 | 16.87 | 15.71 | 15.85 | 22.33 | 19.81 | 16.61 | 13.55 | 15.83 |
| Fe | 13.10 | 13.30 | 9.05 | 12.22 | 9.44 | 10.20 | 13.92 | 15.75 | 11.31 |
| Ni | 0.393 | 0.564 | 0.996 | 0.348 | 1.080 | 0.951 | 0.433 | 0.322 | 0.512 |
| Co | 1.127 | 0.395 | 0.213 | 0.514 | 0.192 | 0.164 | 0.595 | 0.358 | 0.153 |
| Cu | 0.061 | 0.393 | 0.711 | 0.077 | 0.527 | 0.311 | 0.185 | 0.102 | 0.330 |
| Pb | 0.174 | 0.034 | 0.049 | 0.035 | 0.028 | 0.030 | 0.073 | 0.051 | 0.034 |
| Ba | 0.274 | 0.152 | 0.155 | 0.396 | 0.381 | 0.145 | 0.230 | 0.145 | 0.155 |
| Mo | 0.042 | 0.037 | 0.041 | 0.040 | 0.047 | 0.037 | 0.035 | 0.029 | 0.031 |
| V | 0.054 | 0.044 | 0.036 | 0.055 | 0.041 | 0.031 | 0.050 | 0.051 | 0.040 |
| Cr | 0.0011 | 0.0007 | 0.0012 | 0.0051 | 0.0007 | 0.0005 | 0.0007 | 0.0020 | 0.0009 |
| Ti | 0.773 | 0.310 | 0.551 | 0.439 | 0.425 | 0.457 | 1.007 | 0.820 | 0.582 |
| L.O.I. | 39.87 | 25.50 | 22.12 | 24.73 | 24.75 | 27.21 | 23.73 | 25.89 | 27.18 |
| Depth(m) | 1757 | 5001 | 5049 | 1145 | 4537 | 4324 | 3539 | 3793 | 5046 |

1. Mid-Pacific Mountains (5 samples)
2. West Pacific (23 samples)
3. Central Pacific (9 samples)
4. Southern Borderland Seamount Province (5 samples)
5. Northeast Pacific (10 samples)
6. Southeast Pacific (8 samples)
7. South Pacific (11 samples)
8. West Indian Ocean (10 samples)
9. East Indean Ocean (14 samples)

Nodules are also found in the Atlantic Ocean; however, it has been found that generally these nodules contain lower amounts of the more valuable metals and correspondingly high amounts of the less desirable metals which cannot be readily refined and which have little or no value; such as the alkaline earth metals.

Because of the peculiar and intricate crystal structure of the ocean floor nodules, the common refining techniques used for refining of land ores are not generally suitable for the nodules.

Mero in U.S. Pat. No. 3,169,856 discloses a scheme for "separating the nickel from the cobalt in ocean floor ore deposits". The Mero process is directed to a specific type of ocean floor nodule ore wherein the separate mineral phases of manganese and iron contain different metal constituents. Specifically, according to Mero nickel and copper are present only in the manganese phase of the material whereas cobalt is present solely in the iron phase. Mero further states that the oxides are in solid solution within the nodule. Mero reacts the nodule ore with a strong reducing agent, for example, $SO_2$ or $NO_2$.

The Mero process is based upon an alleged unique relationship of the metal constituents in being subdivided between the manganese and iron phases. Mero states that as a result of the phase differences in the nodule ores he has tested, it is possible to carry out a process for differentially leaching these materials from the ore. In a first stage, the ore is contacted with an aqueous solution comprising $SO_2$ or $NO_2$ to selectively leach out manganese, nickel, copper and other mineral elements bound up in the manganese phase of the ore. The cobalt and iron are not leached out. The first solution containing the manganese, nickel and other elements is then treated by various chemical means to separate the different metal values.

Hannay, U.S. Pat. No. 2,259,418, discloses a "continuous cyclic process for the extraction of manganese from its ores". Hannay treats manganese ores containing divalent manganese oxide or divalent manganous carbonate with a sulfuric acid solution obtained from a special type of diaphragm cell for electrolyzing aqueous solutions of manganous sulfate to form the manganese metal. Hannay treats the ore with the sulfuric acid to dissolve the manganous compounds present in the ore, with other metals which are in the ore; Hannay next treats the leach solution to remove metals other than manganese and then feeds the manganous sulfate solution into the cathode compartment of the diaphragm-containing electrolytic cell. The cycle is continued with the reacting of fresh ore with the newly generated sulfuric acid and the feeding of the resulting manganous sulfate to the cathode of the diaphragm cell.

A problem, whose significance has come to be appreciated with the increase in interest in protecting our environment from life-destroying pollutants, is the disposal of various acidic wastes, which are often formed during the treatment of metals or the winning of metals from their ores. For example, the highly efficient procedures of cathodic electroplating pure metals from their metal salt solutions often generates large amounts of free acid. The pickling of steels, using either sulfuric acid or hydrochloric acid, generates the corresponding ferrous salts. The production of titanium dioxide, a white pigment, via a sulfate system, also generates ferrous sulfate. Disposing of these wastes, without polluting the environment can be a costly and difficult procedure.

The present invention provides a process for the refining of an ore containing a primary proportion of manganese and secondary proportions of nickel, copper and cobalt, especially ocean floor nodule ore, wherein the ore is initially leached with an internally recycled acid reagent to preferentially leach out copper and nickel and subsequently leached under reducing conditions to leach out the manganese and cobalt. The reduction leaching is preferably carried out also using waste by-products, from other commercial operations.

In accordance with the present invention, there is provided a method for the selective leaching of metal values from ores containing a primary proportion of manganese and secondary proportions of nickel, copper and cobalt, such as ocean floor nodule ores, which also contain a primary proportion of iron, generally in the trivalent, ferric, form. The method comprises (1) leaching the nodules initially with an aqueous solution of a mineral acid capable of reacting with the ore to form water-soluble salts of copper and nickel, but which does not reduce tetravalent manganese to divalent manganese, to obtain an aqueous pregnant leach solution comprising dissolved copper and nickel salts, e.g. halides or sulfates; and (2) releaching the ore under reducing conditions with an aqueous solution of a reagent which under such conditions is capable of forming the water-soluble salts of cobalt and manganese, respectively, so as to form an aqueous pregnant leach solution comprising the water-soluble salts of manganese and cobalt, preferably, (3) forming a combined pregnant aqueous leach solution comprising water-soluble salts of copper, nickel, cobalt and manganese; followed by (4) subjecting the aqueous pregnant leach solution to selective extraction to selectively extract a metal value so as to obtain a separate solution of an individual desired water-soluble salt of a desired metal value, and (5) reducing the desired metal value to the elemental metal.

When the ore contains a substantial proportion of iron value, it is preferred to separate the soluble copper, nickel cobalt and manganese compounds from any iron compound that may be present. Each metal value separated in an individual solution is preferably reduced by cathodically electroplating each metal, optimally from its respective aqueous solution of a water-soluble salt.

In carrying out the process of this invention, leaching of the ore can be carried out in two separate stages such that the solution formed from the first acid leaching step is separated from the ore prior to leaching under reducing conditions. The two pregnant leach solutions formed from each of the leaching steps can then be combined prior to the carrying out of the selective extraction to obtain the individual metal value. Alternatively, a combined pregnant aqueous leach solution can be formed as follows: the second leaching can be carried out in the presence of the first leach solution by maintaining the first leach solution in admixture with the ore when carrying out the second leaching under reducing conditions. It is only important that the initial acid leaching be carried out prior to carrying out the second reducing leach procedure. A single combined pregnant leach solution is directly obtained by this alternative procedure.

The step of separating the iron compound, which is dissolved during the leach reactions, can be carried out simultaneously with the reducing leaching or subsequently thereto. Encompassed within this procedure are processes wherein the pregnant leach solution is formed containing dissolved iron salt and the iron is subsequently removed from the solution. Also encompassed within this procedure are processes where the iron is converted to a water-insoluble material, e.g. iron oxide, during the releaching operation under reducing conditions and the insoluble iron remains with the insoluble ore solids when the pregnant leach solution is separated therefrom.

If an aqueous pregnant leach solution is formed which contains dissolved iron compounds, the iron can be removed by a variety of means including (1) increasing the pH of the solution to above about 2, and passing oxygen therethrough to precipitate the iron, as the oxide, (2) extracting the soluble iron salts from solution, as by liquid extraction; or (3) drying the solution and then converting the dried iron salt to iron oxide at elevated temperatures of above about 200°C in the presence of water, then dissolving the remaining metal salts and separating the resulting solution from the solid iron oxide.

Preferably, the ocean floor nodule ore is initially comminuted, as in a crusher or grinder, to a size of not greater than about 10 mesh on the U.S. sieve scale and preferably of from about 25 to about 100 mesh.

In a most preferred embodiment of the above procedure, a series of successive selective extractions and/or other purifying procedures results in the formation of an aqueous solution of a manganese salt of a sufficient purity to be used as an electrolyte for the cathodic electroplating of elemental manganese metal, and the formation of the corresponding acid. The sufficiently pure aqueous solution of the manganese salt is thus cathodically electroplated to form the elemental metal and an acid, and the acid is recycled for use as the acid leaching solution for the ore.

The acid leaching solution is a mineral acid, generally, which is capable of reacting with the ore to form the water-soluble salts of copper and nickel, but which does not reduce tetravalent manganese to divalent manganese. Examples of preferred such acids are sulfuric acid and aqueous solutions of a hydrogen halide, especially hydrogen chloride, but also including hydrogen bromide and hydrogen iodide. The acid which is formed is of course dependent upon the anion of the soluble manganese salt, and in the preferred embodiment described below, the manganese salt is determined by the reagent utilized during the reducing leaching for dissolving the manganese and cobalt from the ore.

Preferably, the individual metal values: nickel, copper and cobalt are separated from the leach solution, leaving behind the manganese salt, in solution. The copper, nickel and cobalt are each preferably selectively extracted from the leach solution to form individual solutions of a water-soluble salt of each metal value, and then, optimally, the individual metal values are reduced in a known manner to obtain the elemental metal. In the preferred embodiment, the aqueous pregnant leach solution is contacted with a liquid ion exchange medium capable of selectively extracting at least one of the metal values from the solution. The liquid ion exchange medium is separated from the aqueous solution raffinate and the metal values then stripped from the liquid ion exchange medium to form an aqueous solution of the separated metal value.

The acid leach solution is generally not substantially pure when obtained from an aqueous electrolytic cell, such as the manganese electrolytic cell. When the acid is obtained from such a cell, other compounds are present with the acid, including usually a relatively small proportion of the corresponding salt of the electroplated metal, e.g. sulphuric acid mixed with manganese sulfate. The acid leaching solution can also be obtained as a by-product from, for example, a nickel cell or copper cell. When the cell is of the diaphragm-divided type, the acid is obtained from the anode compartment. The electrolytic cell acid comprises, usually, about 4% by wt. of, for example, $H_2SO_4$, or HCl, as obtained from the usual commercial cells. However, an acid solution of substantially any concentration can be used if available; preferably a concentration of not less than about 2% by wt. $H_2SO_4$ or 2% by wt. of HX, wherein X is $Cl^-$, $Br^-$, or $I^-$, is used, in order to avoid using an excessive volume of leaching solution.

Preferably, the initial leaching of the ore with an acid is carried out under non-reducing conditions. Such leaching can be carried out at ambient temperatures, although temperatures for example, in the range of from about 10° to about 110°C can be utilized, especially for sulphuric acid. When an aqueous solution of a hydrogen halide, especially hydrogen chloride, is utilized, the temperature is preferably maintained below about 90°C; above that temperature, hydrogen chloride, for example, acts as a strong reducing agent. Preferably, temperatures of from about 40° to about 80°C are utilized for the initial acid leaching step. Temperatures of above about 110°C, are unnecessary; this merely increases the complexity and the cost of the operation.

The subsequent leaching of the ore, utilizing a reagent under reducing conditions, is preferably carried out utilizing a reducing agent that is capable of reducing manganese from its tetravalent state to its divalent state and of forming water-soluble salts of manganese and cobalt. Prior to subjecting the acid-leached ore to the reducing leach, it is preferred that the acid be almost depleted.

During the reducing leaching stage, the ore can be treated with an aqueous solution of, preferably, ferrous sulfate or of a ferrous halide, especially ferrous chloride, or of ferrous bromide or ferrous iodide. Sulfurous acid (an aqueous solution of sulfur dioxide) can also be utilized as the reducing reagent. A hydrogen halide solution, especially hydrogen chloride, but also including hydrogen bromide or hydrogen iodide, can be utilized as the reducing reagent, especially when the temperature of the ore and leaching reagent during this stage is maintained at least at about 90°C, and optimally at over about 95°C.

The second, or reducing leaching, can be carried out using a mixture of reducing agents. For example, a solution of ferrous sulfate or ferrous chloride can be contacted with the ore, each alone or in admixture, while passing, for example, either sulfur dioxide or hydrogen chloride through the ore-leach solution mixture. Additional gaseous sulfur dioxide or a hydrogen halide can be bubbled through aqueous solutions of these same materials during releaching. Furthermore, when the initial acid leach reagent is a hydrogen halide, and the temperature of the reducing leach mixture is maintained at above about 95°C, any residual hydrogen halide remaining from the first stage will act as a reducing reagent.

An advantage to using a ferrous halide or ferrous sulfate as the reducing agent, is that any iron present in the ore is not dissolved. Such ferrous salt solutions are often available as waste products, e.g. from acid pickling plants and from titanium dioxide manufacturing plants, and thus can be extremely economical reagents, the use of which can be extremely beneficial to the, e.g. acid pickling plants, as serving as a useful means of disposing of an otherwise dangerous waste product.

When the reducing leaching agent is an acid, such as sulfurous acid or a hydrogen halide solution, the pH of the pregnant leach solution may be too low to precipitate iron oxide; it is therefore preferable to add a basic reagent, such as a caustic solution, to increase the pH, such that any iron material can be readily precipitated therefrom by oxygenating the solution to convert the ferrous salt to insoluble ferric oxide.

The reducing leaching step of the present process can be carried out also at substantially ambient temperatures, depending upon the leaching agent solution utilized. The preferred range of operating temperatures is again from about 10° to about 110°C. Optimum temperatures for a ferrous salt, e.g. ferrous sulfate or a ferrous halide, are from about 50° to about 100°C; for sulfur dioxide and sulfurous acid, from about 20° to about 50°C; and for a hydrogen halide solution, a temperature of at least about 90°C should be utilized. Although higher temperatures can be utilized, it has been found to be unnecessary, and therefore uneconomical, based on the cost of heating the reagent. It is only necessary that reducing conditions be maintained and that the leaching solution be in the liquid state.

Generally, there should be sufficient acid leach solution and reducing leach solution admixed with the ore to form a solution which is less than saturated in each of the desired metal values to be dissolved during each procedure.

The minimum desirable concentration of the metal values in the pregnant leach solution is limited by the cost of handling large volumes of dilute solutions.

Each of the two leaching operations can be carried out in a single stage or in multiple stages, in batch or in continuous flow operation. Preferably, several stages, e.g. mixer-settler stages, are used; however, the design and operation of such contacting procedures and the equipment used therefor are known to the art and do not constitute features of this invention. Equipment and procedures not now generally known can, of course, also be utilized in the future.

The pregnant leach solution can be separated from any solid residue and finally filtered, if desired, to insure complete removal of all particulate solid matter. The solid residue in the preferred embodiment, as stated above, includes insoluble iron oxide as well as any gangue from the ore. The pregnant leach solution can be separated from the insoluble solids by any conventional liquid-solid separation procedure, e.g. filtering or thickening.

It is important that any iron dissolved in the pregnant leach solution be removed prior to further treatment to separate the other metal values, such as by extraction, from the solution. Iron tends to interfere with the preferred methods for separating and purifying the individual metal values remaining in the pregnant leach solution.

Generally, there is some manganese and some cobalt dissolved in the initial acid leach solution. The manganese which is dissolved by the acid leach is usually present in the divalent state in the ore. In the case of ocean floor nodule ore, this can range from zero to about 5% of the total manganese concentration in the ore. The cobalt which would be dissolved by the acid leach solution is generally from about 10 to about 20% of the cobalt present in the ore. The remaining manganese and cobalt is dissolved by the reducing leach solution.

When carrying out the leaching reactions in accordance with the present process in a single stage operation, the ore can first be leached with the desired leaching acid to form an interim pregnant leach solution admixed with any remaining solid ore residue. The ore residue admixed with the interim pregnant leach solution can then be further leached under reducing conditions. The use of reducing conditions can be achieved by the ferrous sulfate or ferrous chloride solution, or the addition of a solid ferrous salt, to the interim pregnant leach solution. Alternatively, a continuous, preferably countercurrent flow, multi-stage procedure can be utilized. In such a procedure, the ore must first be contacted with an acid leach solution and secondly, with a reducing leach solution. When the reducing leach reagent is different from the initial acid reagent, e.g. a ferrous salt for the reducing leach and a sulfuric acid solution for the acid leach, the ore is added to the system at one end of the series of stages, the reducing reagent is added to the system at the other end of the series of leaching stages, and the acid materials are added at an intermediate stage. Therefore, in operation, the ore continues to pass in one direction through the stages, initially being in contact with a final pregnant leach solution, with gradually increasing proportions of free acid, until the intermediate stage is reached, following which only reducing agent is present to remove the manganese and cobalt from the ore, the ore having already been partially depleted in nickel and copper, a major portion of these metals having been leached by the acid.

When the reducing reagent is a ferrous salt, the ferrous salt is oxidized to the corresponding ferric salt which remains in solution; the iron which is present in the ore, however, is not dissolved. The excess iron of the reducing reagent is preferably removed by oxygenating the pregnant leach solution which should be at a pH of above about 2 in order to remove substantially all of the iron; however, if the pH is too low, the solution can be mixed with additional basic material, to further increase the pH, prior to oxygenating.

As a further alternative, if desired, the ore can first be countercurrently contacted, preferably in multiple stages, with an acid leach solution, the remaining solid materials separated from the acid leach solution, and then countercurrently contacted with the reducing reagent; the pregnant leach solutions obtained from the two separate leaching procedures can then be combined to form the desired combined pregnant leach solution.

For separating copper, nickel and cobalt from manganese, leaving a relatively pure manganese solution, especially when it is desired to obtain individual streams of the separate copper, cobalt and nickel values, a liquid ion exchange extraction procedure has been found to be most preferable.

Other procedures can, of course, be utilized for separating out the various metal values. It has been found that the liquid ion exchange procedure is especially useful if it is desired to obtain individual, substantially pure, streams of each of the metal values, i.e. copper, nickel, cobalt and manganese, suitable for reducing to the pure elemental metal. However, if, for example, it is only desired to obtain pure manganese metal, the combined pregnant leach solution could be subjected to a procedure to remove the various more noble metal values, so that the solution could be used as a feed electrolyte to an aqueous electrolytic cell. For example, the pregnant solution can be treated with a sulfide, such as hydrogen sulfide or ammonium sulfide to precipitate the copper, nickel, cobalt and the small amounts of other metal values present, leaving a solution of manganese salt suitable for electrolysis.

The liquid ion exchange extraction procedure requires the use of an extracting medium which is readily separable from water, which comprises an extracting agent selective for extracting one or more of the metal values from the aqueous leach solution and from which the metal value can be readily stripped.

The extracting medium should be immiscible with water to improve the economic efficiency of the process. If the extracting medium were not immiscible with water, a substantial loss of the extracting agent would occur during each extraction, by virtue of at least a partial solubility in the water phase and a loss of the extracting agent in the aqueous raffinate.

Extracting agents which are especially suitable because they are highly specific to the metal values in the leach solutions which are obtained, e.g. from ocean floor nodule ores, include, for example, certain substituted 8-hydroxyquinolines, α-hydroxy oximes and naphthenic acids.

The 8-hydroxyquinoline compounds, which are especially useful for the separation of the metal values in accordance with the present process, can generally be defined by the following formula:

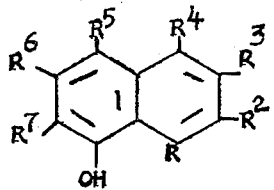

wherein each of the R groups can be hydrogen or hydrocarbyl group or inertly-substituted hydrocarbon groups, such as alkenyl, alkyl, alkynyl, cycloalkyl, cycloalkenyl, aryl or combinations thereof, such as alkaryl, aralkyl, aralkenyl, alkyl-cycloalkyl, etc.

At least one of the R Groups, however, must be a hydrocarbon group. Any inert substituent can be present as long as it does not adversely affect the solubility of the substituted 8-hydroxyquinolines in organic solvents nor adversely affect the solubility in the organic solvent of the metal chelate formed therefrom.

The resulting metal chelate must remain soluble at least to the extent of approximately 2% by weight in the organic solvent.

The preferred position of the hydrocarbyl substituent of the 8-hydroxyquinoline nuclear structure is such as to preferentially complex with the desired metal ion in the aqueous solution. The sum of the carbon atoms in the R Groups must be at least about 8 and can be as high as 24 or more. The preferred R Groups are alkylbenzyl groups or beta-alkenyl groups containing from 12 to 18 carbon atoms, preferably attached at the $R^5$, $R^6$, or $R^7$ position. The optimum position for substitution is at the $R^7$ position to obtain the highest degree of efficiency. For a more complete description of these hydrocarbyl-substituted 8-hydroxyquinolines, see Republic of South Africa specification No. 69/4397 to Budde Jr., et al, assigned to Ashland Oil, Inc.

Representative compounds useful for liquid ion exchange and within the scope of the above general formula are: 7-octylbenzyl-8-hydroxyquinoline, 7-dodecyl-benzyl-8-hydroxyquinoline, 7-nonylbenzyl-8-hydroxyquinoline, 7-ditertiarybutyl-benzyl-8-hydroxyquinoline, 7-hexadecenyl-8-hydroxyquinoline, 7-dibenzyl-8-hydroxyquinoline, 7-dimethyldicyclopentadienyl-8-hydroxyquinoline, 7-phenyl-dodecenyl-8-hydroxyquinoline, and the like where one or more of the hydrocarbyl groups R are attached to ring carbon atoms in the second, third, fourth, fifth and sixth positions. Mixtures of these 8-hydroxyquinoline derivatives can be used if desired.

The second preferred type of metal extracting agents are the alpha-hydroxy oximes, which are disclosed inter alia in U.S. Pat. Nos. 3,224,873; 3,276,863 and 3,479,378. These materials have the general formula:

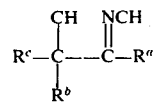

wherein the $R^a$, $R^b$ and $R^c$ groups can be any of a variety of organic hydrocarbon radicals such as aliphatic and alkyl aryl radicals. $R^b$ can also be hydrogen. Preferably $R^a$ and $R^c$ are unsaturated hydrocarbon or branched chain alkyl groups containing from about 6 to about 20 carbon atoms. $R^a$ and $R^c$ are also preferably the same, but when alkyl are preferably linked to the central carbon atoms by a secondary carbon atom, $R^b$ is preferably hydrogen or unsaturated hydrocarbon or branched chain alkyl group containing from about 6 to about 20 carbon atoms. The oxime preferably contains a total of from about 14 to about 40 carbon atoms. Useful $R^a$, $R^b$ and $R^c$ groups include in addition to hydrogen, the mono- and polyunsaturated groups such as heptenyl, octenyl, decenyl, octadecenyl, octadecynyl, and 2-ethyl-octadecenyl, 1,3-heptadienyl.

Alkyl groups include 2-ethylhexyl, 2,3-diethylheptyl, 2-butyldecyl, 2-butylhexadecyl, 2,4-ethylbutyldodecyl, 4-butylcyclohexyl, and the like. Examples of the preferred alpha-hydroxy oximes include 19-hydroxyhexatriaconta-9,27-dien-18-oxime; 5,10-diethyl-8-hydroxytetradecan-7-oxime; 5,8-diethyl-7-hydroxydodecane-6-oxime.

The above liquid ion exchange agents, which are used for the extraction of copper, cobalt and nickel values, are generally chelates and thus remove only the metal values from the solution, leaving behind the anions.

The above hydroxyquinolines and oximes are compounds generally known to industry and commercially available. Any other compounds useful as selective extractants for the metal values in the aqueous systems obtained from the reduction of ocean floor nodules ores can also be used in the process of this invention.

The extracting agent can be a liquid which is itself water-immiscible but generally can be dissolved in a solvent which is substantially immiscible with water. The oximes and hydroxyquinolines are at least partially insoluble in water. It has been found to be preferable to use them in solution in a water-immiscible solvent to form a water-immiscible extraction medium to prevent loss of the extraction agent in the aqueous raffinate.

It has been found, when utilizing common commercially available water-immiscible solvents, that solutions containing from about 2 to about 50 percent by wt. and preferably from about 5 to about 30 percent by wt. of the extracting agent are economically useful as being sufficiently active to remove the desired metal values selectively from the aqueous solution and being sufficiently dilute in the extracting agent so that substantially no extracting agent is leached out and lost in the aqueous raffinate. If it is desired, however, more concentrated solutions can be utilized. Mixtures of extracting agents can be used as long as they are not jointly reactive and do not interfere with the process of this invention.

Useful solvents include generally any inert hydrocarbons which are solvents for the extracting agent, per se, and for the metal chelate, or, extracting agent-metal complex, and which do not react with any of the other materials present, under the conditions of the extraction process. Generally, liquid aliphatic, cycloaliphatic, aromatic, cycloaliphatic-aromatic, aliphatic-aromatic or chlorinated such hydrocarbons are preferably utilized as the solvent for the extracting agent. Optimally, the solvent has a specific gravity in the range of from about 0.65 to about 0.93 and a mid-boiling point in the range of from about 120° to about 615°F. (ASTM distillation). However, substantially any liquid can be used as a solvent that meets the following criteria:

1. A solvent for the extracting agent;
2. A solvent for the extracting agent-metal complex, or chelate;
3. Immiscible with water; and
4. Readily separable from water.

Examples of suitable solvents include benzene, toluene, xylene, aliphatic and aromatic petroleum fractions such as naphtha and derivatives thereof and mixtures of the foregoing. In addition to the aliphatic, aromatic, cycloaliphatic-aromatic, aliphatic-aromatic hydrocarbons and cycloaliphatic hydrocarbons, chlorinated such hydrocarbon liquids can also be usefully utilized.

Light fuel oil, high flash point kerosene and other petroleum hydrocarbons, such as hexane-heptane mixtures are preferred. Generally, the aliphatic materials are most preferred because of their ready availability and ease of separation from the aqueous phase.

The concentration of the extracting agent in the solvent is determined not only by the solubility of the extracting agent per se, but also by the solubility of the extracting agent-metal complex, or chelate.

In addition to the solvent and the extracting agent, there can preferably also be present in the liquid extracting medium a phase modifier which prevents formation of an emulsion with, or entrainment of, the organic phase in the aqueous phase. This is accomplished, it is believed, by altering the interfacial tension and related physical properties of the organic-aqueous mixture during extraction. These phase modifiers are generally most useful when an aliphatic solvent is utilized and include, preferably, aliphatic alcohols containing from about 8 to about 16 carbon atoms such as n-octyl alcohol, n-decyl alcohol, n-dodecyl alcohol, n-tetradecyl alcohol, n-hexadecyl alcohol, isooctyl alcohol, 2-ethylhexyl alcohol, cyclohexanol and mixtures of these and other alcohols. Decanol is a preferred material.

Generally no more than the necessary amount of the phase modifier, e.g., alcohol, which is necessary to inhibit the formation of the emulsion or prevent entrainment, should be used. Usually no more than about 25% by volume of the phase modifier is necessary. Preferably, from about 2 to about 10% by volume is satisfactory and not more than about 5% is most preferred. The phase modifier can be completely eliminated if desired, and, therefore, is optional in the present procedure.

The present invention does not comprise solely the selection of the extracting medium. It is preferred that the extracting medium be a liquid, because liquid-liquid extraction of a normally solid material from solution is a relatively simple and common procedure. However, other extraction procedures can be followed and other types of extractants used.

When utilizing liquid-ion exchange extraction from an aqueous solution of mixed metal halides, a wide range of aqueous phase-to-aqueous-immiscible-phase volume ratios can be utilized in the present invention. Generally, using a 20% by wt. solution of the extracting agent, aqueous-to-aqueous-immiscible phase volume ratios of from about 10:1 to about 1:10 are desirable.

The above two types of extraction agents are especially preferred for the separation of the metal values found in the leach liquid obtained from ocean floor nodules because it has been discovered, as an aspect of this invention, that a single one of these agents can be utilized for the selective removal of all of the important metal values from the pregnant leach and releach solutions. Thus, by utilizing either an $\alpha$-hydroxy oxime or an 8-hydroxyquinoline, a single extracting medium can be utilized for removing, in seriatim, all of the desired metal values. It is unnecessary to utilize a multiple extractant system when utilizing these materials, but is merely necessary to vary the pH of the leach solutions following each successive extraction.

The final pregnant leach solution from the two leaching procedures, i.e. acid and reducing, contains all of the metal values leached from the ore. When ocean floor nodule ores are being refined in accordance with the procedure of this invention, the leach solution contains a primary proportion of a manganese salt and secondary proportions of copper, cobalt and nickel, as well as smaller quantities of a variety of other materials. There usually is also present varied amounts of alkali metal, and perhaps some alkaline earth metal, salts as well.

Extraction of the desired individual metals, especially copper, nickel and cobalt, and the purification of the manganese value can be carried out, for example, by the following general procedures, using liquid ion exchange agents as the metal value extracting means:

1. adjusting the pH of the pregnant leach solution to a pH in the range of from about 1.5 to about 2.5, optimally from about 1.8 to about 2.2. The best results for extracting copper are obtained, for example, at a pH of about 2 when utilizing an alpha-hydroxyoxime or an 8-hydroxyquinoline as the liquid ion exchange extracting agent;

2. mixing the pregnant leach solution with the water-immiscible extracting medium specific to extracting copper;

3. separating the aqueous raffinate, depleted in copper, from the extracting medium phase, rich in copper;

4. adjusting the pH of the aqueous raffinate to the range for extracting nickel and cobalt. Using, for example, an alphahydroxyoxime or an 8-hydroxyquinoline, as defined above, nickel and cobalt can be extracted at a pH in the range of from about 3 to about 7, preferably not greater than about 6 and optimally from about 3.5 to about 5. Generally, it has been found that the best results are obtained at a pH of from about 3.5 to about 4.5. At a pH of greater than about 7, nickel and cobalt, together with the manganese, tend to precipitate;

5. mixing the aqueous raffinate with a water-immiscible extracting medium specific to extracting nickel and cobalt at that pH;

6. separating a second aqueous raffinate, depleted in nickel and cobalt, from the extracting medium phase, rich in cobalt and nickel. The second raffinate contains the dissolved manganese salt.

It is usually necessary to continually add an alkaline material during the above extracting stages in order to maintain the desired pH in the aqueous solutions. The extracting agents act by displacing and releasing hydrogen ions when extracting the metal ions, and thus the pH would decrease during extraction unless additional base were added.

Caustic soda solution is preferably used. An alkali metal ion generally does not interfere with the further processing of any metal salt. However, other useful basic materials include generally the oxides, hydroxides and carbonates of alkali metals and of alkaline earth metals. Such compounds include sodium carbonate, potassium hydroxide, potassium carbonate, lithium hydroxide, lithium carbonate and ammonium hydroxide and ammonium carbonate. Manganese hydroxide and manganese carbonate are especially useful because they do not introduce any additional metal values.

The metal-containing extract medium can be stripped of the metal values by contacting with an aqueous stripping solution. Generally an acidic solution is used. Following stripping, the extracting medium can be recycled for additional extraction.

Copper can be readily stripped by any aqueous mineral acid. The amount of hydrogen ion provided by the stripping liquid must be at least slightly in excess (preferably at least about 5% in excess) of the stoichiometric amount needed to substitute for the metal in the extracting medium. Preferably the stripped copper salt is soluble in the stripping liquid. The preferred stripping acids include sulfuric acid, nitric acid, and hydrochloric acid. As the acid used determines the metal salt to be formed, this can be a basis for selecting the acid, if a particular salt is desired.

As pointed out above, when the nickel and cobalt are present in the leach solution, they are normally extracted together using the preferred types of extracting agents. They can be separated by selectively stripping the nickel from the extract medium, utilizing a weak acid which does not strip cobalt, followed by stripping the cobalt with a stronger acid, usually hydrochloric acid. It has been found that nickel can be stripped using an acid aqueous solution, such as a mineral acid or even the stronger organic acids, such as chloracetic acid, in a concentration of less than about 6 Normal, preferably from about 0.01 Normal to about 3 Normal acid, and most preferably from about 0.1 Normal to about 1.0 Normal. Cobalt can be stripped from the extracting medium using a strong aqueous mineral acid solution, with a concentration of at least 6 Normal in hydrogen ion and 6 Normal in chloride ion. Hydrochloric acid containing at least about 20% by wt. HCl is preferred.

Although the strong acid-chloride solution of cobalt can be directly used for the further reduction to cobalt metal, it is preferred to re-extract the cobalt and then strip again. This can be done by contacting the cobalt-strong hydrochloric acid solution with a tri-alkyl amine, or other material capable of extracting cobalt from an aqueous solution. The amine is preferably dissolved in a water-immiscible solvent to form a solution of the type described above for use with the hydroxyquinolines and oximes.

The tri-alkyl amine solution forms a complex with the cobalt halide and can then be readily separated from the strong acid solution. The cobalt halide can be stripped from the extractant by a weakly acidic aqueous solution, for example, an aqueous electrolyte from cobalt cathodic electroplating.

The aqueous raffinate leach solution remaining after the nickel and cobalt have been removed contains substantially all of the manganese value which was leached from the nodule plus minor amounts of the salts of other metals from the nodule ore.

In order to obtain a sufficiently pure stream of manganese salt, it is advisable to separate the other metals from the manganese. This can be done in various ways: "cementation", e.g. passing the solution through a bed of manganese metal particles which results in the removal of the more noble metals by substitution therefore by manganese, or precipitation, as by sulfide precipitation of the other metals present. The remaining manganese salt in solution can then be utilized for the preparation of manganese metal by any conventional means. The presence of alkali or alkaline earth metals results in no interference at this point.

The solutions of the individual metal salts can then be treated in a conventional manner to reduce them to the elemental metals, e.g. by cathodic electroplating techniques. For example, manganese sulfate or manganese chloride can be reduced to manganese in an aqueous electrolytic cell. Copper, nickel and cobalt salts, can be reduced to the metal from aqueous solutions in electrolytic cells.

The electrolytic procedures include the conventional methods for electrolytically reducing the salts to the elemental metals and the exact procedure forms no part of this invention. However, preferably, aqueous electrolysis procedures are followed wherein the electrolysis solution comprising sulfuric acid or an aqueous solution of hydrogen halide can be utilized in leaching metal values from the ore, and in stripping the metal value from the liquid ion exchange medium.

It should be noted that under this procedure the electrolyte salt, which is obtained from the liquid ion exchange medium, need not be the original salt produced during the leaching reactions. The salts formed when the metal values are stripped from the extraction medium depends upon the acid which is used for the stripping.

For a more complete explanation and description of various electrolysis, or cathodic electroplating, refining procedures, see *Graham Electroplating and Engineering Handbook* (1971), for example.

The drawing accompanying this application is a schematic flow diagram of one preferred procedure for a two reagent leaching of the ocean floor nodule ore in accordance with this invention.

Referring to the drawing, ocean floor nodule ore is initially crushed, in a grinder, to a particle size of from about 35 to about 100 mesh. The crushed ore is then contacted with the leaching reagents in a continuous, countercurrent flow, mixer-settler system. As shown in the diagram, there are six contact stages; the ore passes from stage 1 to stage 6; fresh reducing reagent, e.g. an aqueous solution of ferrous sulfate, is fed to stage 6. The ore residue is discharged from the bottom of stage 6. An acid leaching solution, e.g. sulfuric acid solution, recycled from the manganese electrolytic cell, is admixed with the leach solution from stage 4. Thus, in stages 1, 2 and 3, the first three contact stages for the ore, the ore is leached under acid conditions and in stages 4, 5 and 6, the last three contact stages for the ore, the ore is leached under reducing conditions. The initial three ore contact stages (stages 1, 2 and 3) contain not only the acid leach solution but also the solution obtained from the reducing stages, which contains dissolved manganese and cobalt values. The ore is partially depleted in nickel and copper value after leaving stage 3.

The aqueous pregnant leach solution leaving stage 1 thus comprises a primary proportion of manganese sulfate plus secondary proportions of copper sulfate, nickel sulfate and cobalt sulfate, plus the salts of a variety of other metals which are usually present in the nodule ore, usually including dissolved iron. The aqueous pregnant leach solution is then aerated to precipitate any dissolved iron which was present in the ore, as well as the iron from the ferrous sulfate; the precipitated iron is separated from the aqueous pregnant leach solution.

The final pregnant leach solution at a pH of approximately 2 is next preferably treated by a liquid ion exchange process to separate out the individual metal values. The pregnant leach solution is first extracted with a liquid ion exchange medium, specific to extracting copper.

The liquid ion exchange agent, e.g. an alpha-hydroxyoxime or a 8-hydroxyquinoline, is dissolved in an organic medium which is immiscible with the aqueous leach solution.

A base is added to the aqueous raffinate from the copper extraction to increase the pH to at least about 3.5, and nickel and cobalt is next extracted. The aqueous raffinate from the nickel and cobalt extraction contains primarily manganese salt. Prior to feeding the nickel/cobalt raffinate to a manganese electrolysis cell, it is preferred to remove the relatively small proportions of other metal values which may be present, expecially those metals which are more noble than manganese. These other metal values are often not present in amounts sufficient to warrant recovery. They are removed, for example, by sulfide precipitation, so that they do not interfere with the electroplating of the manganese metal from the aqueous solution.

The extract medium obtained from the nickel/cobalt extraction step is first selectively stripped of its nickel content by the spent electrolyte from the nickel electroplating cell, containing sulphuric acid in an amount sufficient to replace all of the nickel held by the extracting agent. The partially stripped extract medium is next stripped of its cobalt value by contacting with an aqueous hydrochloric acid solution containing at least about 20% by weight of hydrogen chloride.

The highly acidic aqueous stripping solution containing the cobalt, is then contacted with a 5–30% by weight, solution of an organic amine, e.g. tri (iso-octyl) amine in kerosene to reextract cobalt. Cobalt chloride can be readily stripped from the amine extract solution using the electrolyte solution from a cobalt chloride cell. The aqueous strip solution containing the cobalt chloride can be fed directly to the cobalt chloride electrolysis cell. The amine reextracting solution and the 20% HCl stripping solution can then be recycled.

The extracted copper from the first extraction can be stripped from the extraction medium by an acid solution having a hydrogen concentration in an amount to provide at least 5% excess of hydrogen ion of the stoichiometric amount required to substitute for the copper. In the drawing, the acid is recycled from a copper sulfate aqueous electrolysis cell. The copper value is thus stripped from the extract medium as copper sulfate, which solution can be directly fed to the electrolytic cell. The extracting medium is then recycled to the extraction stage. The stripping of the extracting medium and the extracting of the pregnant leach solution with the extracting medium can be carried out by conventional liquid-liquid contact equipment. Preferably, multistage countercurrent flow extraction is carried out in multiple mixer-settler stages or in an extraction column.

In the drawing, the dashed lines, represent the organic extracting medium.

The following examples set forth preferred embodiments of the present invention and are exemplary and not exclusive of the full range of this invention.

EXAMPLE I

Ocean floor nodule ore was obtained having the following composition.

| COMPONENT | % BY WEIGHT (of metal) |
| --- | --- |
| manganese | 17.6 |
| iron | 11.6 |
| nickel | 0.61 |
| cobalt | 0.32 |
| copper | 0.1 |

A sample comprising 31 grams of the above nodule ore was ground to an average particle size of less than about 50 mesh and initially contacted with 500 milliliters (ml.) of a 4% by wt. $H_2SO_4$ solution as the acid leach solution. The aqueous solution and ground nodule ore is continuously mixed for a period of about 14 hours, at a temperature of 60°C, after which time about 57 grams (g) of ferrous sulfate ($FeSO_4 \cdot 7 H_2O$) is added to the mixture and the mixed liquid and solids continuously mixed for an additional 5 hours with a paddle mixer. Air is then bubbled through the mixture for an additional hour with continued mixing. The temperature is maintained at 60°C.

The aerated mixture is then filtered to separate a final leach solution from the solid ore residue, which includes iron oxide.

The pregnant leach solution is analyzed to determine the amount of manganese, nickel, cobalt and copper present in terms of the percentage by weight of the metal present in the ore that is dissolved:

Manganese-91%, nickel-84%, cobalt-87%, copper-81%

The pregnant leach solution has a pH of about 2. The copper value is extracted by liquid ion exchange means. The pregnant leach solution is contacted with a solution comprising 10% by volume of an alpha-hydroxyoxime (5,8-diethyl-7-hydroxy dodecane-6-oxime) known as LIX–64N, 20% by volume isodecanol and a mixed hydrocarbon solvent comprising aromatic and aliphatic petroleum hydrocarbons having a boiling point range of 410°–460°F. and a specific gravity of 0.81.

The aqueous leach solution and the extracting medium are passed countercurrently through three mixer-settler stages at an organic-to-aqueous ratio of 1:1 by volume. The aqueous raffinate from the copper extraction contained substantially all of the nickel, cobalt and manganese values originally present but substantially all of the copper is extracted.

Following the separation from the final settling stage, the organic extract is stripped of copper by a sulfuric acid solution from a copper sulfate aqueous electrolysis cell, having a hydrogen ion concentration of 3N, utilizing countercurrent flow through three mixer-settler stages.

The nickel and cobalt is separated from the aqueous raffinate solution using the same LIX 64N extracting medium. The aqueous raffinate from the copper extraction step is adjusted to a pH of about 4.5 by the addition of 2N caustic solution. The aqueous raffinate solution is treated in a 3-stage countercurrent, mixer-settler system with the LIX 64N extracting medium and the nickel and cobalt values are extracted.

The organic extract phase from the final settler stage contains substantially all of the cobalt and nickel present in the pregnant leach solution, but is substantially free of copper and manganese.

The nickel is stripped from this extract using the spent electrolyte solution from a nickel sulfate electrolysis cell to which sulfuric acid was added to a concentration of hydrogen ion of 3N in order to insure stripping of all of the nickel. The organic liquid and stripping acid are passed countercurrently through three mixer-settler stages at an organic-to-aqueous liquid ratio of 1:1 by volume. Substantially, all of the nickel is removed from the organic phase.

The cobalt is stripped from the organic extract phase by contacting the organic phase with an aqueous solution containing 20% by wt. HCl in a four-stage, countercurrent, mixer-settler system, at an organic-to-aqueous ratio of 3:1. The cobalt is reextracted from the 20% HCl solution obtained from the final mixer-settler stripping stage using a kerosene solution containing 10% by volume tri(isooctyl)amine (TIOA) in a three-stage, countercurrent, mixer-settler system at an organic-to-aqueous volume ratio of 2:1. The cobalt is stripped from the TIOA solution utilizing the spent aqueous electrolyte from the cobalt chloride electrolysis cell in a three-stage countercurrent, mixer-settler system at a 1:2 organic-to-aqueous phase volume ratio.

The raffinate from the above nickel and cobalt extraction contains primarily manganese sulfate. The raffinate is treated with ammonium sulfide to precipitate various other metal sulfides leaving a solution of manganese sulfate suitable for treatment by electroplating. The metals precipitated out by the sulfide treatment include the small proportions of relatively noble metals which were present in the nodule ore and which were leached therefrom.

There are thus obtained, as a result of this preferred process, four separate final streams, each containing a substantially pure soluble metal salt - copper sulfate, nickel sulfate, cobalt chloride and manganese sulfate, respectively. Each of these solutions is then fed to an aqueous electrolytic cell to reduce the salt to the respective elemental metal, i.e. cathodically electroplate the elemental metal.

The advantage of the embodiment of the present invention described in this Example is that the two primary leaching reagents, sulfuric acid and ferrous sulfate, are waste by-products from industrial operations, one of which is a final stage of this process. Such by-products are normally a problem to dispose of, and herein become valuable and useful primary reagents.

EXAMPLE 2

Example 1 above is repeated, but substituting for the LIX 64N extraction medium an extraction medium comprising 10% by volume 7-[3-(5,5,7,7,-tetramethyl-1-octenyl)] -8 -hydroxyquinoline, and 20% by volume isodecanol in a kerosene solvent. Similar results are obtained as when using the LIX 64N extraction medium.

EXAMPLE 3

Example 1 above was repeated except that the first leach solution was 500 ml. of an aqueous solution of 3% by wt. HCl, fed at a temperature of 60°C, and the second leaching agent was $FeCl_2$ (30 grams). Substantially the same results are obtained as in Example 1, except that the pregnant leach solution comprised the chlorides of the metal values leached.

What is claimed is:

1. A process for selectively removing metal values from an ocean floor nodule ore, the ore comprising a primary proportion of manganese and iron and secondary proportions of nickel, copper and cobalt, the process comprising the steps of (a) leaching the ore with an aqueous solution of a mineral acid which is capable of reacting with the ore to preferentially form water-soluble salts of nickel and copper, to obtain an initial aqueous leach solution comprising dissolved iron, copper and nickel salts derived from the respective metal values present in the ore and a solid leached ore, and (b) releaching the solid leached ore under reducing conditions, with an aqueous solution of a reducing reagent which is capable of reducing tetravalent manganese to divalent manganese and of forming water-soluble salts of cobalt and divalent manganese, so as to form a final aqueous leach solution comprising dissolved manganese and cobalt salts, whereby the copper, cobalt, nickel and manganese values in the ore are removed therefrom in the form of dissolved salts.

2. The process of claim 1, wherein the final aqueous leach solution is a combined aqueous pregnant leach solution which comprises the dissolved salts of copper, cobalt, nickel, iron and divalent manganese.

3. The process of claim 2, comprising in addition, separating the solid ore residue from the initial leach solution prior to releaching the leached ore and admixing the initial and final leach solutions to form a combined aqueous pregnant leach solution comprising the dissolved salts of copper, nickel, cobalt, iron and manganese.

4. The process of claim 1, wherein the mineral acid is selected from the group consisting of sulfuric acid and aqueous solutions of a hydrogen halide.

5. The process of claim 4, wherein the mineral acid is sulfuric acid.

6. The process of claim 4, wherein the mineral acid is an aqueous solution of hydrogen chloride.

7. The process of claim 1, wherein the reducing reagent is selected from the group consisting of sulfur dioxide, ferrous sulfate, ferrous halides and hydrogen halides.

8. The process of claim 7, wherein the reducing agent is ferrous sulfate.

9. The process of claim 7, wherein the reducing agent is ferrous chloride.

10. The process of claim 7, wherein the reducing agent is sulfur dioxide and additional iron is dissolved.

11. The process of claim 7, wherein the reducing agent is hydrogen chloride and additional iron is dissolved.

12. The process of claim 1, wherein the reducing agent is an aqueous solution of ferrous sulfate or ferrous chloride, which is the effluent from an acid pickling plant.

13. A process for selectively removing metal values from an ocean floor nodule ore, the ore comprising a primary proportion of manganese, and iron and secondary proportions of nickel, copper and cobalt, the process comprising the steps of (a) leaching the ore with an aqueous solution of a mineral acid which is capable of reacting with the ore to preferentially form water-soluble salts of nickel and copper, to obtain an initial aqueous leach solution comprising dissolved iron, copper and nickel salts derived from the respective metal values present in the ore, in admixture with the solid leached ore, and (b) releaching, the solid leached ore in admixture with the initial aqueous leach solution under reducing conditions, whereby tetravalent manganese can be reduced to divalent manganese and water-soluble salts of cobalt and divalent manganese can be formed, to form a combined aqueous pregnant leach solution which comprises the dissolved salts of copper, cobalt, nickel, iron and manganese.

14. The process of claim 13, comprising, in addition, separating the iron, copper, cobalt and nickel values from the combined aqueous leach solution to form a single aqueous solution comprising dissolved manganese salt.

15. The process of claim 14, wherein the single aqueous solution is suitable for use as an electrolyte for the cathodic electroplating of manganese metal, and comprising, in addition, subjecting the single solution to electrolysis to cathodically electroplate elemental manganese metal and to form the acid corresponding to the manganese salt, and recycling the acid for use as the mineral acid for leaching the ore.

16. The process of claim 15, wherein the manganese salt is manganous sulfate or a manganous halide and the corresponding mineral acid is sulfuric acid or an aqueous hydrogen halide, respectively.

17. The process of claim 13, comprising, in addition, adding to the solid ore-initial leach solution mixture, a reducing agent selected from the group consisting of ferrous sulfate, sulfur dioxide, ferrous halides and hydrogen halides.

18. The process of claim 13, wherein a metal value is selectively extracted from the combined pregnant leach solution by contacting the solution with a liquid ion exchange agent so as to form a solution comprising the substantially pure dissolved metal value.

19. The process for obtaining desirable metals from ocean floor nodule ore, the ore comprising as primary components the oxides of manganese and iron and as secondary components, compounds of copper, cobalt and nickel, the process comprising the steps of (a) leaching the ore with an aqueous solution of a mineral acid which is capable of reacting with the ore to preferentially form water-soluble salts of nickel and copper to obtain an initial aqueous leach solution comprising dissolved iron, copper and nickel salts derived from the respective metal values present in the ore and a solid leached ore, (b) releaching the solid leached ore, under reducing conditions, with an aqueous solution of a reducing agent which is capable of reducing tetravalent manganese to divalent manganese and forming the water-soluble salts of cobalt and divalent manganese, so as to form the water-soluble salts of cobalt and divalent manganese, (c) forming a combined aqueous pregnant leach solution which comprises the dissolved salts of iron, copper, cobalt, nickel and manganese, (d) separating the dissolved iron, nickel, cobalt and copper values from the aqueous solution so as to form a single aqueous solution comprising a soluble manganese salt which is suitable for use as a feed solution to an electrolytic cell to form the elemental manganese metal.

20. The process of claim 19, comprising in addition, oxygenating the combined aqueous pregnant leach solution so as to precipitate insoluble iron oxide therefrom whereby the aqueous pregnant leach solution is rendered free of undesirable dissolved iron.

21. The process of claim 20, wherein the copper, nickel and cobalt values are sequentially selectively extracted from the combined pregnant leach solution so as to form independent streams comprising the salts of each of copper, cobalt and nickel, respectively.

22. The process of claim 21, wherein the reducing agent is sulfur dioxide or ferrous sulfate, the leaching acid is sulphuric acid and comprising in addition, obtaining a solution comprising manganese sulfate sufficiently free from metal values more noble than manganese as to be satisfactory for use as an electrolyte feed to an electrolysis cell; feeding the solution of manganese sulfate to an electrolysis cell so as to cathodically electroplate elemental manganese metal and form sulphuric acid; and recycling the sulphuric acid thus formed to leach the ore.

23. The process of claim 21, wherein the reducing agent is selected from the group consisting of ferrous halides and hydrogen halides and wherein the leaching acid is a hydrogen halide aqueous solution and comprising, in addition, obtaining a solution comprising a manganese halide substantially free from metal values more noble than manganese as to be satisfactory for use as an electrolyte feed to an electrolysis cell; feeding the manganese halide solution to an electrolysis cell so as to cathodically electroplate elemental manganese metal and to form an aqueous solution of the corresponding hydrogen halide; and recycling the aqueous solution of the hydrogen halide to leach the ore.

24. The process of claim 19, wherein the reducing releaching is carried out at a temperature of from about 50 to about 100°C.

25. The procedure of claim 19, wherein the acid leaching is carried out at a temperature of from about 40° to about 80°C.

26. The procedure of claim 19, wherein the reducing agent is hydrochloric acid and the releaching is carried out at a temperature of from about 95° to about 110°C.

27. A process for selectively removing metal values from an ocean floor nodule ore, the ore comprising a primary proportion of manganese and iron and secondary proportion of nickel, copper and cobalt, the process comprising the steps of (a) leaching the ore with an aqueous solution of a mineral acid which is capable of reacting with the ore to preferentially form water-soluble salts of nickel and copper, to obtain an initial leach solution comprising dissolved iron, copper and nickel salts derived from respective metal values present in the ore and a solid leached ore; (b) separating the initial aqueous leach solution from the solid leached ore; (c) releaching the solid leached ore under reducing conditions with an aqueous solution of a reducing agent which is capable of reducing tetravalent manganese to divalent manganese and forming water-soluble salts of cobalt and divalent manganese, so as to form a final aqueous leach solution comprising dissolved manganese and cobalt salts, whereby the copper, cobalt, nickel and manganese values are removed in the form of dissolved salts; and (d) admixing the initial leach solution and the final leach solution to obtain a combined aqueous pregnant leach solution comprising the dissolved salts of iron, copper, cobalt, nickel and manganese.

28. The process of claim 1, wherein the reducing reagent is ferrous sulfate or ferrous chloride, which is the effluent from an acid pickling plant, and wherein the final aqueous leach solution also comprises a dissolved ferrous compound.

29. The process of claim 28, comprising in addition, removing any dissolved ferrous compound from the final aqueous leach solution by maintaining the pH of the solution at least at about 2 and oxygenating the solution so as to precipitate iron as an insoluble iron oxide.

* * * * *

UNITED STATES PATENT OFFICE
CERTIFICATE OF CORRECTION

Patent No. 3,923,615      Dated October 2, 1975

Inventor(s) William S. Kane et al.

It is certified that error appears in the above-identified patent and that said Letters Patent are hereby corrected as shown below:

The term of this patent subsequent to

March 5, 1991, has been disclaimed.

Signed and Sealed this twenty-second Day of June 1976

[SEAL]

Attest:

RUTH C. MASON
*Attesting Officer*

C. MARSHALL DANN
*Commissioner of Patents and Trademarks*